Figure 1:
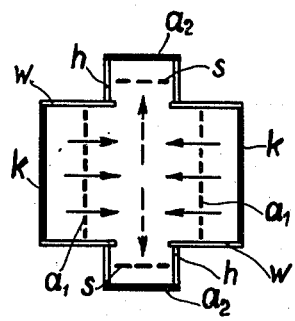
Figure 2:
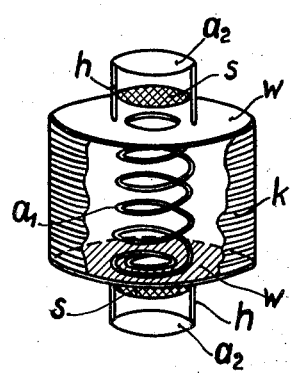

March 14, 1933. G. SEIBT 1,901,004

ELECTRIC GLOW DISCHARGE TUBE

Filed March 12, 1931

G. Seibt
INVENTOR

By: Marks & Clerk
ATTYS.

Patented Mar. 14, 1933

1,901,004

UNITED STATES PATENT OFFICE

GEORG SEIBT, OF BERLIN-SCHONEBERG, GERMANY

ELECTRIC GLOW DISCHARGE TUBE

Application filed March 12, 1931, Serial No. 522,121, and in Germany March 18, 1930.

This invention relates to an electric discharge tube provided with a controlling electrode, in which the source of electrons is not constituted by an incandescent filament, as has hitherto been the case, but by a glow discharge which takes place between two separate electrodes.

The essential feature of the present invention consists in this that the current which flows from the glow discharge path to a second anode, the so-called "amplifying anode" is not simply a continuation of the glow discharge current. On the contrary, the said amplification current is preferably derived at such points of the tube at which the discharge particles which are produced by the glow discharge have a velocity which is as small as possible and which is no longer dependent on the velocity of the glow discharge field. For this purpose, those parts come mainly into consideration which lie outside the glow discharge field but in the proximity thereof, at which points presumably only diffused electrons are mainly present which are for instance produced by a repeated impact or repulsion of electrons which are emitted from the individual solid parts of the subdivided pair of glow discharge electrodes. As these clouds of electrons have a relatively small initial velocity, it is possible to draw them into the amplification field, containing also the controlling electrode, substantially only by the voltage which exists at the second anode; in this respect we thus obtain an action which is similar to the action in the case of thermionic tubes with heated filaments.

Starting with these theoretical assumptions (the validity of which still remains to be seen, although they are confirmed by the empirical results hitherto obtained) according to the present invention a new arrangement of electrodes is provided which permits the amplification current, that is to say the number of the electrons drawn out from the glow discharge field for amplification purposes to be substantially increased.

In applicant's arrangements as hitherto proposed, the two discharge electrodes were preferably in the form of two concentric cylinders, which were subdivided by strip-like recesses parallel to the axis of the cylinders. A portion of the clouds of electrons surrounding the discharge path between each two solid parts of the pair of discharge electrodes was drawn through the said recesses into the amplification field. According to the present invention, in order better to utilize the glow discharge serving as a source of electrons, the pair of glow discharge electrodes are constituted by two or more parts and are so arranged that practically all the particles of the glow discharge impinge on one another in a space from which they are drawn out, preferably at right angles to the direction of the field of glow discharge by the voltage field of the second anode. It has previously been proposed to arrange an amplification field at right angles to the glow discharge field; however, the mistake was made in previous arrangements that the electrons for the amplification field were drawn out directly from the glow discharge field, where they possess the full velocity which is imparted by the voltage of the glow discharge. According to the present invention the electrons of the glow discharge field are first of all brought into a space where they lose their velocity of the glow discharge field as much as possible by the impact on one another; it is only after this has taken place that the electrons are drawn towards the amplifying anode.

The invention is illustrated by way of example in the accompanying drawing, the illustration of the various examples having been limited to the parts which are necessary for the understanding of the invention, namely the electrodes.

Figure 3:
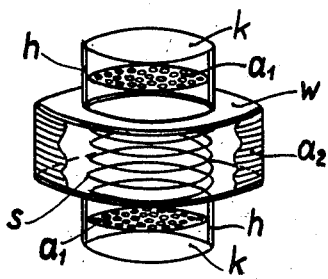

Figures 1, 2, 4, 5 and 6 illustrate diagramatically several embodiments of the invention in which the glow discharge electrodes are arranged concentrically, the second anode and the controlling electrode being arranged at right angles to the axis of said concentric electrodes. Figure 3 shows an embodiment in which the second anode and the controlling electrode are arranged as concentric cylinders, the discharge electrodes being arranged at right angles to the axis of said concentric cylinders.

Figure 1 illustrates the fundamental idea of the invention essentially in a diagrammatic maner. The two discharge electrodes $k$ and $a_1$ are arranged in two single pairs lying opposite one another in such a manner that the electrons constituting the continuation of each glow discharge field meet in a definite space. For this purpose the discharge anode $a_1$ is constructed in the form of a perforated plate or as a grid. The electrons thus follow the path indicated by the arrows shown in full lines. The electrons impinge on one another in the middle, where they substantially lose the velocity of the glow discharge field because of the distribution of the field in this space.

The largest portion of electrons can then be drawn out through the discharge anode $a_2$, which is also constituted by two separate parts arranged above and below the glow discharge field. The path of this amplification current is indicated by the arrows shown in interrupted lines. Before the said amplification curent reaches the amplifying anode $a_2$ it passes through one or more controlling grids $s$, the controlling action of which is very extensive since the controlled currents are accelerated essentially only by the amplification voltages which are applied to the anode $a_2$. The pair of discharge electrodes $k$ and $a_1$ is covered above and below by insulating walls $w$ in such a manner that the electrons of the glow discharge field which are emitted by $k$ in a straight line, cannot reach by a direct path the amplifying anode or the controlling grid $s$. In this way the insulating walls referred to produce the same screening effect as that obtained in applicant's prior applications Serial Nos. 391,049 and 391,050 by the platelike formation of the discharge anode.

The amplifying electrodes $s$ and $a_2$ are preferably carried by supports $h$. These supports may consist of small bars or they may be in the shape of a cylinder resting on the insulating walls $w$. Of course, the supporting bars and the cylinder are also made of insulating material.

The arrangement illustrated in Figure 1 may be modified in various respects. According to Figure 2 the system of electrodes, viz. two of the electrodes, are arranged concentrically. The cathode $k$ consists of a solid sheet-metal cylinder which is perforated in the example shown. The discharge anode $a_1$ is in the form of a cylindrical helix which is arranged concentrically with respect to the cathode. Of course, instead of a cylindrical helix, use may be made of a cylindrical network or of a cylinder which is perforated.

The two discharge electrodes are covered at their ends by insulating walls $w$, which walls are provided in the centre with an opening, the diameter of which is preferably not larger than the diameter of the cylindrical anode $a_1$. Outside the said openings there are provided, as in the arrangement illustrated in Figure 1, a controlling electrode $s$ and an amplifying anode $a_2$. The upper amplifying anode and the upper controlling electrode are of course in conductive connection with the lower amplifying anode and the lower controlling electrode respectively. $h$ are the insulating supports in the form of bars or cylinders. The requirement that the amplification field shall preferably be at right angles to the discharge field can be fulfilled by an arrangement such as shown in Figure 3, wherein the amplifying electrodes are constructed as concentric cylinders and the discharge electrodes in the form of plates which are at right angles to the axis of the cylinder. It will be seen that in Figure 3 the discharge electrodes and the amplifying electrodes have been interchanged as compared with Figure 2. The cathode $k$ and the discharge anode $a_1$ are in the form of plates arranged parallel to one another, the glow discharges of each pair of these plates being continued through the openings in $a_1$ into the interior of the arrangement. The electrons which lose the velocity of the glow discharge field at that place are then drawn out laterally by the voltage which is applied to the cylindrical amplifying anode $a_2$ and they are controlled by the controlling electrode $s$ which is arranged in the form of a cylindrical helix concentrically with respect to the amplifying anode $a_2$.

It has already been pointed out above that also in the arrangement of electrodes according to the present invention it is preferable to provide that only such electrons can reach the controlling grid and the amplifying anode $a_2$ which have lost to a substantial extent the velocity of the glow discharge field and to prevent a direct glow discharge taking place from the discharge cathode $k$ to the amplifying anode $a_2$, the voltage of which lies above the voltage of the discharge anode. The screening effect between glow discharge field and amplification field is best ensured according to the present invention by the hereinbefore described insulating covering plates $w$.

Figure 4:
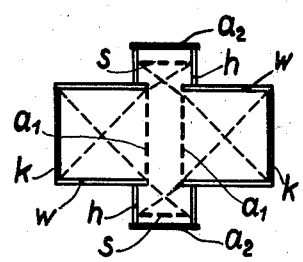
Figure 5:
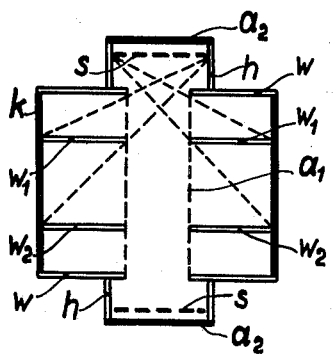

Figure 4 shows by the dotted boundary lines, that this object can easily be attained by suitably dimensioning and arranging the electrodes. It is preferable in this case to make the diameter of the discharge anode $a_1$ approximately equal to the diameter of the openings which are provided in the screening walls $w$. In this way it is attained that the largest portion of the clouds of electrons which are within $a_1$ can be utilized for the amplification field.

If, in an arrangement as shown in Figure 4, the length of the cathode cylinder $k$ is made comparatively great, the screening by the end walls $w$ causes some difficulties sometimes since the amplifying electrodes must be arranged comparatively far with respect to the openings in the walls $w$. This disadvantage is avoided by the arrangement illustrated in Figure 5, in which, in addition to the end walls $w$, separate insulating walls $w_1$, $w_2$ which run parallel to the said end walls $w$, are arranged in the interior of the cathode space.

The said plates $w_1$, $w_2$ are made of the same size and shape as the end walls $w$ and they act in such a way that they compel the glow discharge to maintain its direction towards the discharge anode $a_1$. As will easily be seen, for geometrical reasons it is advisable to place the said intermediate walls—which in the case of systems of long electrodes can be arranged in a correspondingly increased number—at smaller distances from one another towards the ends of the cathode $k$ as compared with its central part.

Figure 6:
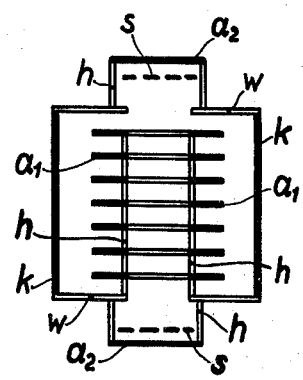

Figure 6 illustrates an arrangement in which the screening effect of the intermediate walls $w_1$, $w_2$ is effected by suitably shaping the discharge anode $a_1$, itself. In this case the discharge anode is not in the shape of a grid but it is composed of a number of flat rings the planes of which are at right angles to the axis of the cylinder $k$. Also in this arrangement the electrons of the glow discharge field are prevented from flying directly from the cathode $k$ to one of the amplifying electrodes; all the electrons are compelled to reach into the space lying round the axis of the two discharge electrodes in so far as they do not impinge on the discharge anode $a_1$ itself. Instead of making the individual parts of the discharge anode $a_1$ in the form of flat rings, the whole of the discharge anode may consist of a cylindrical helix constituted by a wide metal band, the plane of which is at right angles to the axis of the cylinder, that is to say it is constructed in the form of a circular staircase. Thus, for instance, it is an advantage to construct the cathode of a material which will not disintegrate, for instance tungsten, tantalum, molybdenum, or the like. Further, it is advisable to cover the discharge cathode with a substance which reduces the cathode drop, or to manufacture it of such a material. Such materials are, for instance, aluminium, magnesium, the oxides of barium, strontium, calcium, etc.

Further, the measure that in order to reduce the amplifier voltage, the distance between the second anode and the controlling electrode has to be such that it lies within the range of the free path of the discharge or is smaller than the same, may be applied to the tube according to the present invention. Owing to the arrangement of the electrodes, it may not be possible to make the distance between the discharge anode and the amplifying anode less than the free path; however, this is possible as regards the path between the controlling electrode and the amplifying anode. If use is, for instance, made of any of the arrangements illustrated in Figures 2, 4 and 5 or 6, it is possible in practice to make the distance between the two flat electrodes $s$ and $a_2$ as small as possible. In this case this measure is adequate for the purpose in view of the fact that between these two electrodes the maximum voltage is applied at which no ignition as yet takes place.

In comparison therewith, the voltage between the amplifying anode and the discharge anode is smaller, since the controlling electrode has a negative voltage bias of a few volts.

A great advantage of the arrangement according to the present invention consists in this that without giving up the advantages secured by the arrangement according to the prior applications Serial Nos. 391,049 and 391,050 (reduction in the grid current), the yield of the glow discharge path in electrons is considerably increased by this that the surface of the glow discharge cathode is substantially increased. As is well known, the strength of a glow discharge current depends, in addition to the gas filling, voltage, etc., only upon the size of the cathode. Whilst in the arrangement according to Applicant's earlier applications it was necessary to give the cathode a small surface for various reasons, according to the present invention the surface of the cathode is substantially larger. Thus, for instance, the whole of the inner wall surface of the cathode cylinder (see Figs. 2, 4, 5 and 6) may efficiently be utilized. In connection therewith the discharge anode $a_1$ may have a very small surface. The condition must be fulfilled that the shape of the discharge anode shall enable the glow discharge field to be continued in the middle space between the individual pairs of electrodes, so that the desired impact of the electrons coming from different directions should take place there, which electrons are then utilized for the amplification current after they have lost the speed of the glow discharge field.

A further very important advantage of the arrangement according to the present invention lies in the possibility of reducing the negative grid current by the following measure:

Referring for instance to Figure 1, it has already been pointed out above that the electrons which come from the cathode $k$ and pass through the anode $a_1$ impinge upon one another in the middle of the system and are drawn therefrom laterally towards the two sides of the amplifying anode $a_2$. These electrons are also penetrated by positively charged particles, the so-called "cations". It is these cations which cause the very detrimental negative grid current when they impinge upon the controlling electrode $s$, the removal of which grid current it has not been possible fully to effect by the means hitherto proposed. According to a further feature of the invention, the cations can be kept away from the controlling electrode by this that (see for instance Figure 1) a negatively charged electrode is used instead of a pair of amplifying electrodes $a_2$, $s$. If this modification is, for instance, effected with respect to the upper pair of electrodes in Fig. 1, the cations are attracted from the middle discharge space towards the said negatively charged electrode, that is to say in the direction of the arrow pointing upwards. The amplification current which flows towards the amplification electrodes $a_2$, $s$ in the direction of the arrow pointing downwards, is then substantially free of cations and consists of a practically pure electron discharge which does not allow a negative grid current to be produced. At the same time the negatively charged electrode has the effect that it repulses the electrons forming the amplification current, that is to say it assists the formation of the amplification current which flows toward $a_2$. In this arrangement the negatively charged auxiliary electrode may be constructed either in the form of a single electrode or a portion of the amplification electrodes may be used for this purpose.

The gas filling preferably consists of rare gases such as neon or helium which are preferably used under a pressure of a few millimetres, for instance 1–5 mms. Less pressure is employed when the tube is for instance used as an amplifier tube and is intended to work substantially on voltage, that is to say when it is connected as a resistance-coupled amplifier. On the other hand, if it is desired to obtain amplified currents which shall be as large as possible, it is preferable to use higher gas pressure.

Under certain conditions an increase in the yield of electrons can be attained by this that use is not made simply of a glow discharge between the discharge electrodes but of an electric arc discharge. In such cases the concentric arrangement of the discharge electrodes is not very suitable and an arrangement such as shown in Figure 3 is to be preferred. In that case, the parts of the cathode are not constructed flat but are spherical.

What I claim is:—

1. A glow discharge tube having a cathode and a first anode, the discharge between which serves as a source of electrons, a second anode to which an amplification current passes from the said source of electrons, and a controlling electrode which controls the said amplification current, parts of said cathode being arranged opposite one another, parts of said first anode being also arranged opposite one another and being enclosed by said parts of said cathode, said discharge electrodes enclosing a central space in which the glow discharge particles passing from said cathode through said first anode fly against one another from several directions and impinge on one another, parts of said second anode being arranged at right angles to said discharge electrodes and enclosing said central space and being adapted to attract the electrons from said central space at right angles to their original direction and parts of said controlling grid being arranged between said central space and said second anode.

2. A glow discharge tube having a cathode and a first anode, the discharge between which serves as a source of electrons, a second anode to which an amplification current passes from the said source of electrons, and a controlling electrode which controls the said amplification current, parts of said cathode being arranged opposite one another, parts of said first anode being also arranged opposite one another and being enclosed by said parts of said cathode, said cathode and said first anode being arranged as concentric cylinders which enclose a central space in which the glow discharge particles pasing from said cathode through said first anode fly against one another from several directions and impinge on one another, parts of said second anode being arranged at right angles to the axis of said discharge electrodes and including said central space and being adapted to attract the electrons from said central space at right angles to their original directions, parts of said controlling grid being arranged between said central space and said second anode, said controlling electrode being arranged at right angles to the axis of the cylinders constituted by said cathode and said first anode.

3. A glow discharge tube having a cathode and a first anode, the discharge between which serves as a source of electrons, a second anode to which an amplification current passes from the said source of electrons, and a controlling electrode which controls the said amplification current, parts of said cathode being arranged opposite one another, parts of said first anode being also arranged opposite one another and being enclosed by said parts of said cathode, said cathode and said first anode being arranged as concentric cylinders which enclose a central space in which the glow discharge particles passing from said cathode through said first anode fly against one another from several directions and impinge on one another, parts of said second anode being arranged at right angles to the axis of said discharge electrodes and enclosing said central space, and being adapted to attract the electrons from said central space at right angles to their original directions, parts of said controlling grid being arranged between said central space and said second anode, said controlling electrode being arranged at right angles to the axis of the cylinders constituted by said cathode and said first anode, and walls of insulating material covering the end surfaces of said cylindrical electrodes.

4. A glow discharge tube having a cathode and a first anode, the discharge between which serves as a source of electrons, a second anode to which an amplification current passes from the said source of electrons, and a controlling electrode which controls the said amplification current, parts of said cathode being arranged opposite one another parts of said first anode being also arranged opposite one another and being enclosed by said parts of said cathode, said cathode and said first anode being arranged as concentric cylinders which enclose a central space in which the glow discharge particles passing from said cathode through said first anode fly against one another from several directions and impinge on one another, parts of said second anode being arranged at right angles to the axis of said discharge electrodes and including said central space and being adapted to attract the electrons from said central space at right angles to their original directions, parts of said controlling grid being arranged between said central space and said second anode, said controlling electrode being arranged at right angles to the axis of the cylinders constituted by said cathode and said first anode, and walls of insulating material covering the end surfaces of said cylindrical electrodes, said walls having an opening in the centre, opposite said second anode and said controlling electrode.

5. A glow discharge tube having a cathode and a first anode, the discharge between which serves as a source of electrons, a second anode to which an amplification current passes from the said source of electrons, and a controlling electrode which controls the said amplification current, parts of said cathode being arranged opposite one another, parts of said first anode being also arranged opposite one another and being enclosed by said parts of said cathode, said cathode and said first anode being arranged as concentric cylinders which enclose a central space in which the glow discharge particles passing from said cathode through said first anode fly against one another from several directions and impinge on one another, parts of said second anode being arranged at right angles to the axis of said discharge electrodes and enclosing said central space and being adapted to attract the electrons from said central space at right angles to their original directions, parts of said controlling grid being arranged between said central space and said second anode, said controlling electrode being arranged at right angles to the axis of the cylinders constituted by said cathode and said first anode, said central space of said cylindrical electrodes being provided with flat rings arranged at right angles to the axis of said cylinders to prevent a straight line discharge between said cathode and said second anode.

6. A glow discharge tube having a cathode and a first anode, the discharge between which serves as a source of electrons, a second anode to which an amplification current passes from the said source of electrons, and a controlling electrode which controls the said amplification current parts of said cathode being arranged opposite one another, parts of said first anode being also arranged opposite one another and being enclosed by said parts of said cathode, said cathode and said first anode being arranged as concentric cylinders which enclose a central space in which the glow discharge particles passing from said cathode through said first anode fly against one another from several directions and impinge on one another, parts of said second anode being arranged at right angles to the axis of said discharge electrodes and enclosing said central space and being adapted to attract the electrons from said central space at right angles to their original directions, parts of said controlling grid being arranged between said central space and, said first anode being formed as a cylindrical spiral.

7. A glow discharge tube having a cathode and a first anode, the discharge between which serves as a source of electrons, a second anode to which an amplification current passes from the said source of electrons, and a controlling electrode which controls the said amplification current, parts of said cathode being arranged opposite one another, parts of said first anode being also arranged opposite one another and being enclosed by said parts of said cathode, said cathode and said first anode being arranged as concentric cylinders which enclose a central space in which the glow discharge particles passing from said cathode through said first anode fly against one another from several directions and impinge on one another, parts of said second anode being arranged at right angles to the axis of said discharge electrodes and enclosing said central space and being adapted to attract the electrons from said central space at right angles to their original directions, parts of said controlling grid being arranged between said central space and said second anode, said controlling electrode being arranged at right angles to the axis of the cylinders constituted by said cathode and said first anode and a negatively charged electrode being arranged at one end of said central space opposite said second anode, said electrode being adapted to attract the positively charged discharge particles (cations) from said central space.

In testimony whereof I have signed my name to this specification.

GEORG SEIBT.